Nov. 9, 1943.    H. F. MURPHY ET AL    2,333,877
TIRE CHAIN APPLYING TOOL
Filed April 23, 1941
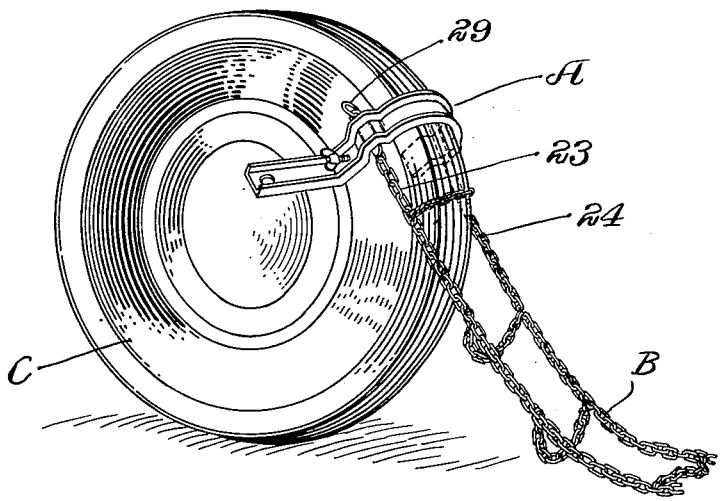
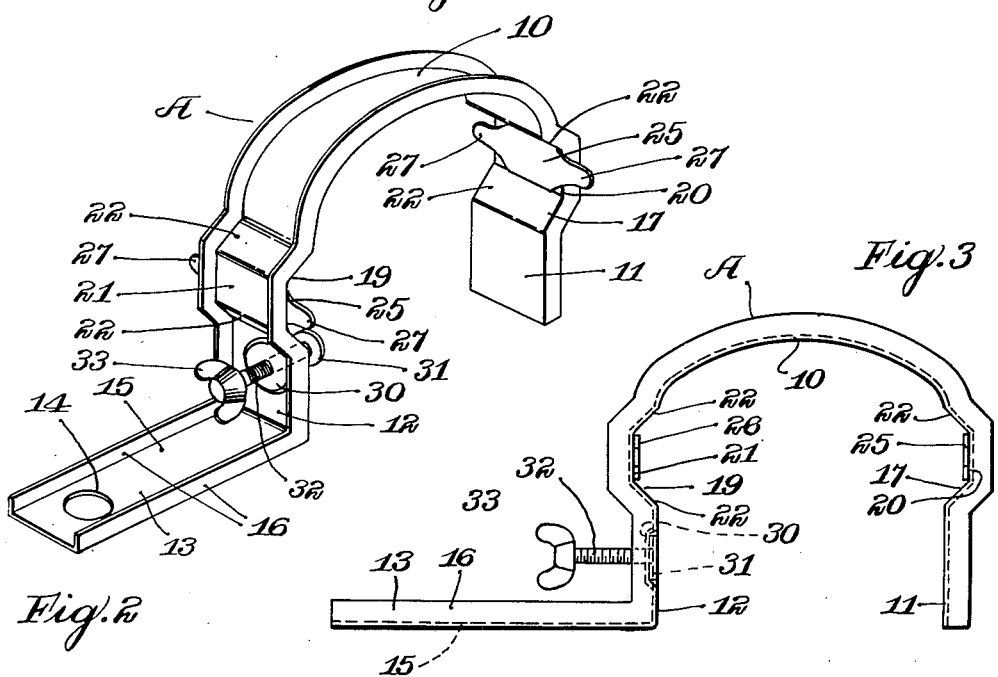
Harley F. Murphy
Thomas J. Horton
INVENTOR
BY Robert M. Dunning
ATTORNEY Patented Nov. 9, 1943

2,333,877

UNITED STATES PATENT OFFICE 2,333,877

TIRE CHAIN APPLYING TOOL

Harley F. Murphy and Thomas J. Horton,
St. Paul, Minn.

Application April 23, 1941, Serial No. 389,878

2 Claims. (Cl. 81—15.8)

Our invention relates to an improvement in tire chain applying tool, wherein it is desired to provide a device which will simplify the application of a tire chain to a tire.

In order to properly apply a tire chain to a tire, two methods are commonly used. The first and most commonly used method is to lie the chain upon the ground in front of or behind the wheel to which each chain is to be applied and to move the car until the wheel is in position on the chain. This method has the obvious difficulty of necessitating the moving of the car, which is sometimes not permissible. The method has the greater disadvantage, however, of locking the chain against the ground, thereby making it difficult to apply the chain as tightly about the tire as would otherwise be possible. It is difficult to move the car so that the tire will rest in just the right spot so that the chain will be centered with respect to the tire and thus not clamp any of the cross chains to make the chain applying operation difficult.

The second method commonly used in applying a chain to a tire includes jacking the wheel off the ground, placing the center portion of the chain over the tire and wrapping the chain into proper position with the wheel spaced from the ground. While this method has some advantages over the previously described method, it is somewhat difficult to accomplish as it is necessary to manually wrap the chain about the tire. As the wheel and chain are usually dusty or dirty, the task is disagreeable and distasteful.

It is the object of the present invention to provide a device which will enable the chain to be wrapped about the tire simply and easily, and using a minimum of effort. We provide a U-shaped bracket which is clamped over the surface of the tire. This bracket supports one end of the tire chain. By rotating the tire, either by moving the vehicle or by rotating the individual wheel, the chain may be wrapped about the tire with ease.

It is a feature of the present invention to provide a rigid clamp which will not be affected by the weight of the vehicle as the chain is applied by moving the vehicle after the clamp has been applied to the wheel. The clamp comprises a bracket which is secured in place upon the wheel by any suitable means, such as a thumb screw. During the rotation of the vehicle wheel the clamp comes in contact with the surface of the ground, but is not compressed or flexed by this engagement with the ground. Accordingly the clamp maintains its engagement with the supported end of the tire chain.

It is a feature of our invention to provide a clamp bracket which is of U-shape to fit over the surface of a tire, and which is provided with a pair of oppositely disposed channels in the sides thereof, through which the ends of the chain extend. Hook means are provided adjacent these channels for engagement with the individual ends of the tire chain. These hook means hold the chain interiorly of the clamping bracket. Accordingly the opposite ends of the chain may be attached together while the bracket is still in clamping position, and the bracket may be easily removed after the chain has been secured in place.

It is a feature of our invention that the clamping bracket is provided with a handle end which extends outwardly from the tire so that the bracket may be easily handled. This handle is particularly advantageous when the chain is applied while the wheel is jacked up off the surface of the ground, and in this event the handle forms a means of rotating the wheel. The handle is so designed as to extend outwardly beyond the fender of the vehicle so that it may be readily grasped.

A further feature of our invention relates to the construction of our clamping bracket. This bracket is so constructed that as the vehicle is moved along the ground with the clamping bracket attached to the wheel, the driver will be able to determine when the wheel has made approximately one complete revolution. It will be noted that our clamping bracket is formed of channel iron, or the like, so that in the rotation of the wheel, the wheel bearing the bracket will be raised appreciably when the bracket comes into contact with the ground. This fact provides a signal to the driver that the wheel has completed nearly one complete revolution.

These and other objects and novel features of our invention will be more clearly and fully set forth in the following specification and claims.

In the drawing forming a part of our specification:

Figure 1 is a perspective view of a vehicle wheel with our clamping bracket secured thereto and with a tire chain in position to be attached to the wheel.

Figure 2 is a perspective view of the clamping bracket removed from the vehicle wheel.

Figure 3 is an end elevation view of the clamping bracket.

The clamping bracket A comprises a curved channel strip which is generally U-shaped in formation. The central closed end of the U is formed by a curved channel portion 10 which terminates on one side in the side channel strip. The other side of the U is formed by the side strip 12. The channel strip is bent at substantially right angles from the side strip 12 to form the handle 13. An aperture 14 is provided in the handle 13 so that the tool may be hung up if it is so desired when not in use.

The channel strip from which the tool A is formed includes a base 15 and a pair of parallel side strips 16. The side strips 16 reinforce the tool and prevent the tool from flexing to any considerable extent. Even when the weight of the car is resting upon the clamping bracket A this bracket does not flex to any appreciable degree.

A pair of channels 17 and 19 are formed in the opposed side strips 11 and 12 by offsetting a portion of these side strips into substantially parallel relation to the remainder of these strips. Thus, portions 20 and 21 of the side strips 11 and 12 extend substantially parallel to the ends of the side strips 11 and 12 and are connected thereto by offset connecting portions 22. These channels 17 and 19 are provided for the opposed ends 23 and 24 of the tire chain B to permit this tire chain to extend in contact with the side walls of the tire.

Secured by welding or other suitable means to the parallel portions 20 and 21 of the channels 17 and 19 we provide hook plates 25 and 26. These hook plates are provided with hook ends 27 of a size to fit through a link of the tire chain B. In actual practice the hook end 27 is preferably placed through a link of the chain B, somewhat spaced from the extreme end of the chain so as to provide extending chain portions, such as 29 which may be connected to the other end of the tire chain B.

A circular recessed portion 30 is provided in the side strip 12 which is of proper depth to countersink the bearing plate 31, rotatably mounted on the end of the thumb screw or bolt 32. The manner in which the bearing plate 31 is recessed into the side strip 12 is illustrated in Figure 3 of the drawing. A wing nut type of head 33 is provided on the bolt 32 to permit the clamping bracket to be secured to the tire without the use of tools.

In operation, when it is desired to secure the chain B to the tire C the clamping bracket A is secured over the tread of the tire in the manner best illustrated in Figure 1 of the drawing. Previous to attaching the clamping bracket A to the tire the chain B has been attached to the clamping bracket by extending one of the hook ends 27 through a link of the chain B on each of the chains 23 and 24 near the extreme end thereof. As the clamping bracket A is applied to the tire, the individual chains 23 and 24 of the chain B extend through the channels 17 and 19 and are held in proximity with the side walls of the tire C.

If the wheel has been jacked up for the chain applying operation the wheel C is then merely rotated by the handle end 13 until the chain is wrapped about the tire, whereupon the ends of the chain are secured together. If the chain is to be applied without jacking up the wheel, the operator spreads the chain behind the wheel and drives forwardly. When the wheel has nearly completed one complete revolution the driver will feel the wheel raise as the clamping bracket A engages the ground. By continuing the forward movement of the vehicle a short distance after the bracket has been in engagement with the ground, one complete revolution of the wheel is made and it is only necessary to attach the ends of the tire chain in the usual manner.

After the chain has been attached in place, the bracket A may be readily removed by relieving the pressure of the thumb screw 33 upon the bearing plate 30. By pivoting the bracket slightly as it is removed the hook ends 27 are removed from engagement with the chain and the bracket may then be readily removed without difficulty. Thus the bracket holds the end of the chain in place until the chain is completely attached in place upon the tire.

In accordance with the patent statutes we have described the principles of construction and operation of our tire chain applying tool, and while we have endeavored to set forth the best embodiment thereof, we desire to have it understood that this is only illustrative of a means of carrying out our invention and that obvious changes may be made within the scope of the following claims without departing from the spirit of our invention.

We claim:

1. A tire chain applying tool comprising a rigid substantially U-shaped bracket, means for securing said bracket in position over the tread of a tire, oppositely disposed outwardly projecting channels in the sides of said bracket of a size to accommodate the chain extending therethrough, said channels extending across the width of the sides of said bracket, and hook means engageable with the links of a tire chain secured to said bracket within said channels and projecting longitudinally of said channels in either direction.

2. A tire chain applying tool comprising a rigid substantially U-shaped bracket, means for securing said bracket in position over the tread of a tire, oppositely disposed outwardly projecting channels in the sides of said bracket of a size to accommodate the chain extending therethrough, said channels extending across the width of the sides of said bracket, and opposed hook means engageable with the links of a tire chain on said bracket at each end of each of said channels, said hook means projecting longitudinally of said channels in either direction.

HARLEY F. MURPHY.
THOMAS J. HORTON.